US011124124B2

(12) United States Patent
Waskie

(10) Patent No.: US 11,124,124 B2
(45) Date of Patent: Sep. 21, 2021

(54) CARGO AREA PARTITION SYSTEM FOR A VEHICLE

(71) Applicant: GM GLOBAL TECHNOLOGY OPERATIONS LLC, Detroit, MI (US)

(72) Inventor: David B. Waskie, Wixom, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 121 days.

(21) Appl. No.: 16/553,860

(22) Filed: Aug. 28, 2019

(65) Prior Publication Data
US 2021/0061176 A1  Mar. 4, 2021

(51) Int. Cl.
B60R 5/04 (2006.01)
B60R 21/02 (2006.01)
B60R 11/00 (2006.01)
A01K 29/00 (2006.01)

(52) U.S. Cl.
CPC .............. B60R 5/04 (2013.01); A01K 29/00 (2013.01); B60R 21/026 (2013.01); B60R 2011/0036 (2013.01)

(58) Field of Classification Search
CPC .. B60R 5/04; B60R 5/00; B60R 11/00; B60R 2011/0003; B60R 2011/0036; B60R 2011/0017; B60R 7/02; B60R 7/00; B60R 21/00; B60N 2/36; B60N 2/206; B60N 2/856; B60N 2/859; A01K 29/00

USPC ................. 297/378.1, 0.11, 0.12, 0.13, 0.14; 296/24.4, 24.43, 24.31, 69
See application file for complete search history.

(56) References Cited

U.S. PATENT DOCUMENTS

| | | |
|---|---|---|
| 8,528,957 B2 | 9/2013 | Ugalde et al. |
| 8,757,695 B2 | 6/2014 | Dinger et al. |
| 8,814,245 B1 | 8/2014 | Welch et al. |
| 9,610,897 B2 | 4/2017 | Huelke et al. |
| 10,059,269 B2 | 8/2018 | Herman |
| 10,160,388 B2 | 12/2018 | Hernandez Aviles et al. |
| 10,315,582 B2 | 6/2019 | Southey et al. |
| 10,363,859 B2 | 7/2019 | Murray et al. |
| 2004/0217614 A1* | 11/2004 | Schlecht ............... B60R 21/026 296/24.4 |
| 2011/0260490 A1* | 10/2011 | Farcas ................. B60N 2/3065 296/65.09 |
| 2018/0202202 A1* | 7/2018 | Celis Torres ......... E05C 17/085 |

* cited by examiner

Primary Examiner — Dennis H Pedder
Assistant Examiner — Joyce Eileen Hill

(57) ABSTRACT

A cargo area partition system for a vehicle includes a rear seat positioned within a cabin area of the vehicle and adjacent a cargo area in the vehicle. The rear seat includes a rear seat back that is pivotally positionable between an upright position and a substantially horizontal position. The system further includes a seat striker adapted to engage and to releasably fix the rear seat back in an upright position, and a partition panel configured to releasably engage the seat striker and define a partition in the cargo area when the rear seat back is positioned in the substantially horizontal position.

15 Claims, 5 Drawing Sheets

CARGO AREA PARTITION SYSTEM FOR A VEHICLE

The present disclosure relates to a multifunctional cargo cover for a vehicle.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

SUMMARY

In an exemplary aspect, a cargo area partition system for a vehicle includes a rear seat positioned within a cabin area of the vehicle and adjacent a cargo area in the vehicle. The rear seat includes a rear seat back that is pivotally positionable between an upright position and a substantially horizontal position. The system further includes a seat striker adapted to engage and to releasably fix the rear seat back in an upright position, and a partition panel configured to releasably engage the seat striker and define a partition in the cargo area when the rear seat back is positioned in the substantially horizontal position In another exemplary aspect, the seat striker defines a laterally inwardly and rearwardly facing notch.

In another exemplary aspect, an edge portion of the partition panel releasably engages the seat striker notch when defining a partition in the cargo area.

In another exemplary aspect, a longitudinal depth of the notch in the seat striker is larger than a thickness of the edge portion of the partition panel.

In another exemplary aspect, the system further includes a rear quarter panel at least partially laterally defining the cargo area in the vehicle and forming a landing portion rearwardly supporting the partition panel.

In another exemplary aspect, a height of the partition panel extends from a hinge area of the rear seat back to a top of the rear quarter trim panel.

In another exemplary aspect, the system further includes a partition bracket defining a channel configured to receive an edge portion of the partition panel and further adapted to engage the seat striker to releasably fix the partition bracket to the seat striker.

In another exemplary aspect, the partition bracket includes a first portion defining the channel and a second portion including an engagement mechanism configured to engage the rear seat striker.

In another exemplary aspect, the partition bracket further includes a plurality of springs resiliently biasing the first portion away from the second portion.

In another exemplary aspect, the partition bracket further includes a rotatable cam mechanism which, when positioned at a first rotary position extends the first portion away from the second portion and when positioned at a second rotary position moves the first portion closer to the second portion than when at the first rotary position Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
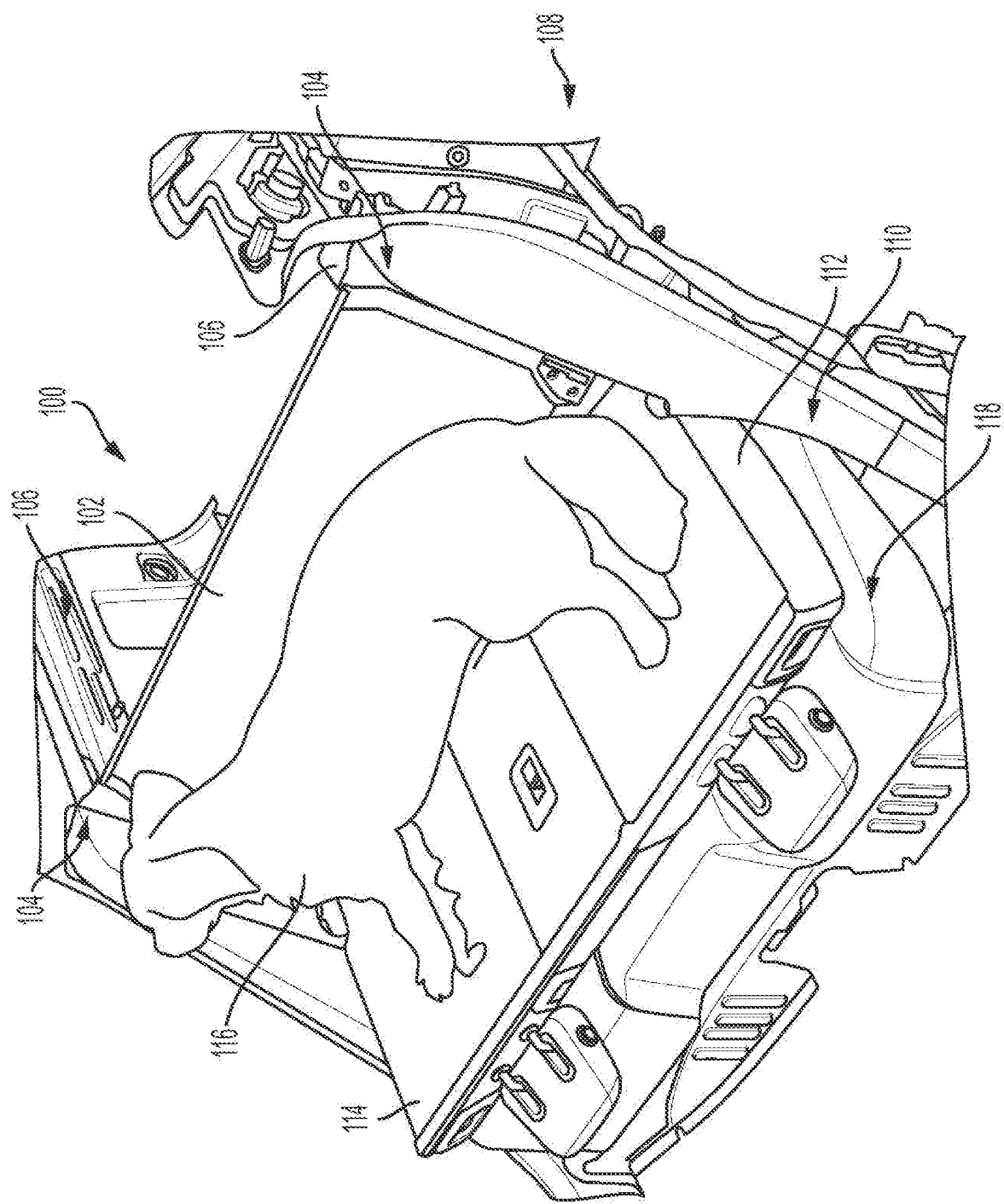
FIG. 1 is a perspective view of a rear seat cargo area of a vehicle 108 incorporating an exemplary embodiment of a cargo area partition system 100 in accordance with the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Figure 3:
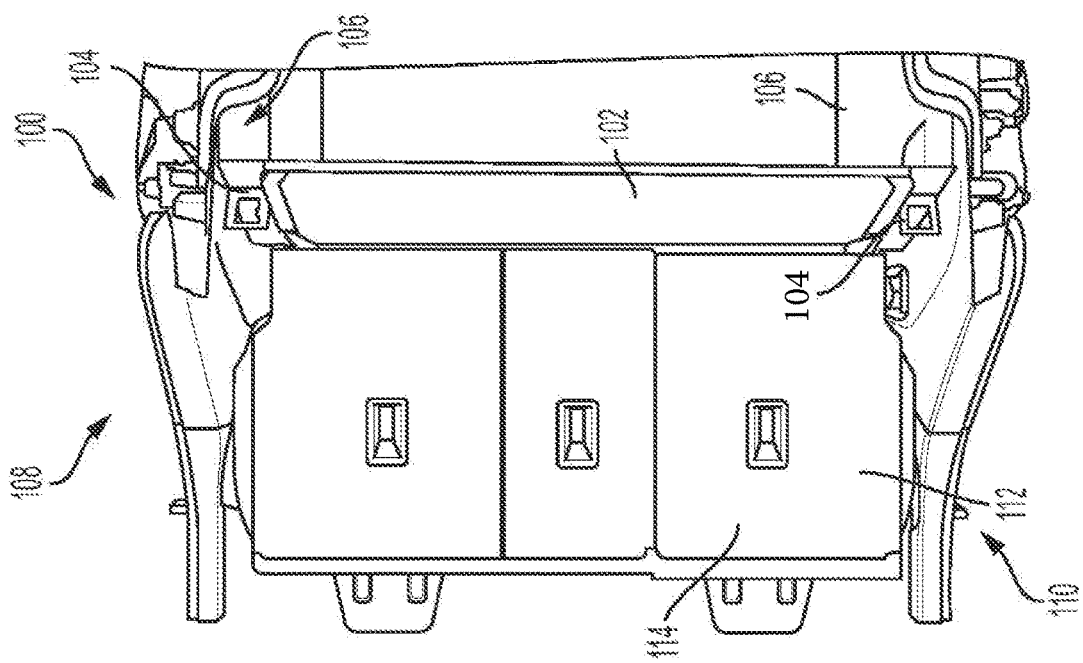
FIG. 3 is a plan view of the cargo area partition system 100 of FIG. 1.

Referring now to the drawings, wherein like reference numbers correspond to like or similar components throughout the several figures, FIG. 1 is a perspective view of a rear seat cargo area of a vehicle 108 incorporating an exemplary embodiment of a cargo area partition system 100 and FIG. 3 provides a plan view of the cargo area partition system of FIG. 1. The cargo area partition system 100 includes a partition panel 102 which engages seat back strikers 104 and landing portions of rear quarter trim panels 106 in a vehicle 108. The vehicle 108 includes a rear seat 110 with a rear seat back 112 positioned in a lowered configuration to thereby provide are rear surface 114 of the rear seat back 112 as a load floor for the cargo area of the vehicle 108. FIG. 1 further illustrates an exemplary use case for the cargo area partition system 100 of the vehicle 108 where a pet 116 may be positioned on the rear seat back 112 rear surface 114 and forward of the partition panel 102. In this use case of the exemplary cargo area partition system 100, the rear seat surfaces 118 which may include for example, a leather, vinyl, and or cloth seat surface, may be protected from contact with the pet 116. In addition, the partition panel 102 segregates the pet 116 from a portion of the cargo area located rearward from the partition panel 102.

Figure 2:
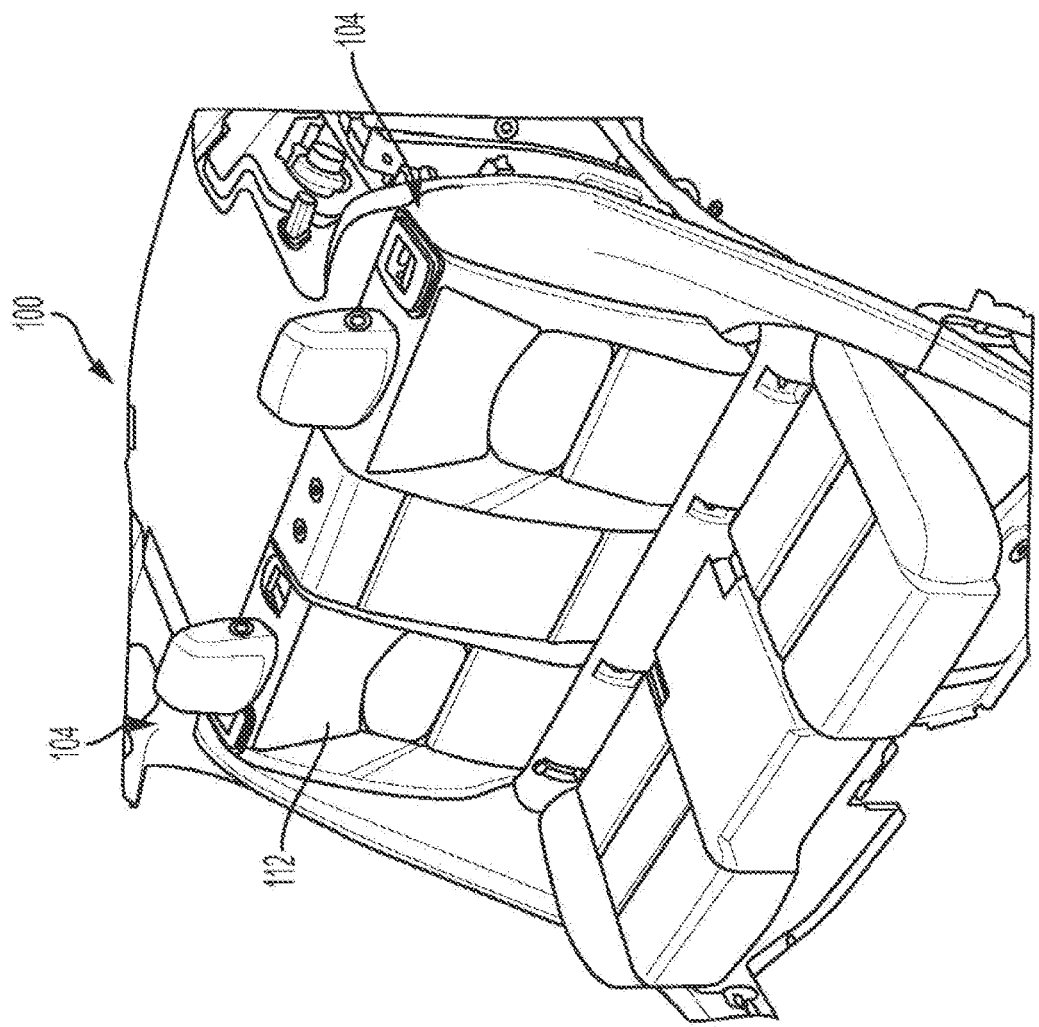
FIG. 2 is a perspective view of the cargo area partition system 100 of FIG. 1 in another configuration.

FIG. 2 provides a perspective view of the cargo area partition system 100 of FIG. 1 in another configuration. In the configuration illustrated in FIG. 2, the rear seat back 112 is positioned in an upright position and engages with the seat back strikers 104 to releasably secure the rear seat back 112 in the upright position. As illustrated in FIG. 2, the partition panel 102 is positioned to the rear of the rear seat back 112 and engages channels (not shown) formed in rear quarter trim panels 106 to form a cargo area cover. In this manner, the partition panel 102 is optionally capable of serving dual functions of a cargo area partition in the configuration illustrated in, for example, FIG. 1, and as a cargo area cover in the configuration illustrated in, for example, FIG. 2.

Figure 5:
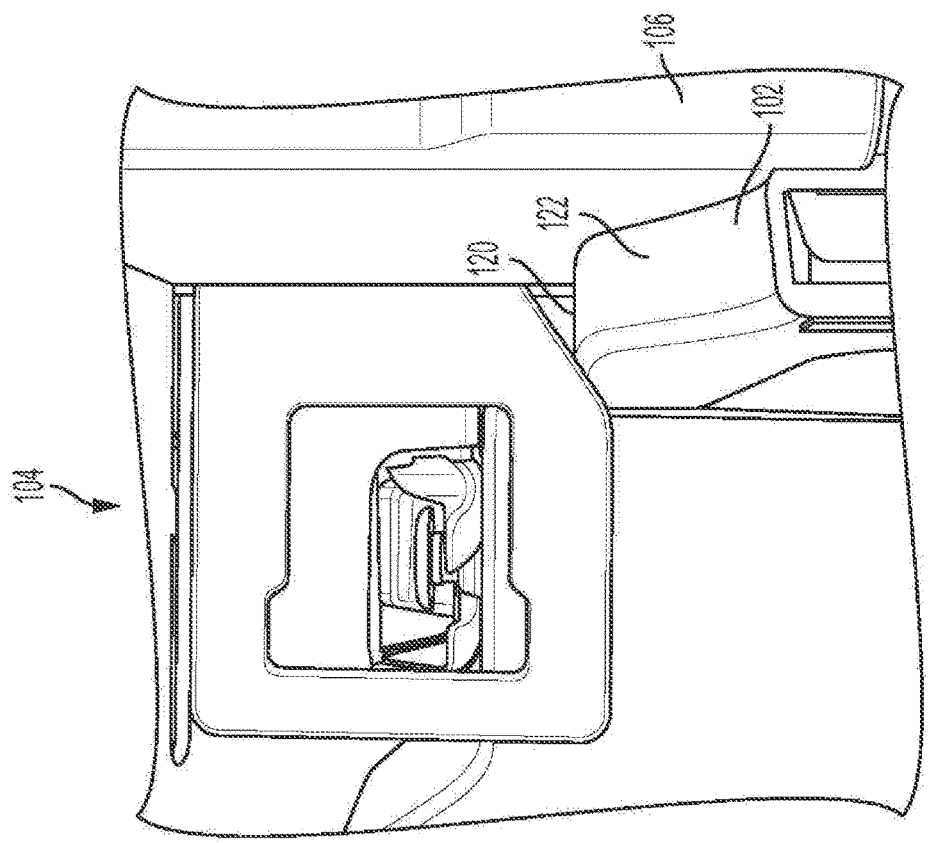
FIG. 5 is another close-up perspective view of the seat striker 104 of the cargo area partition system 100 of FIG. 1.
Figure 4:
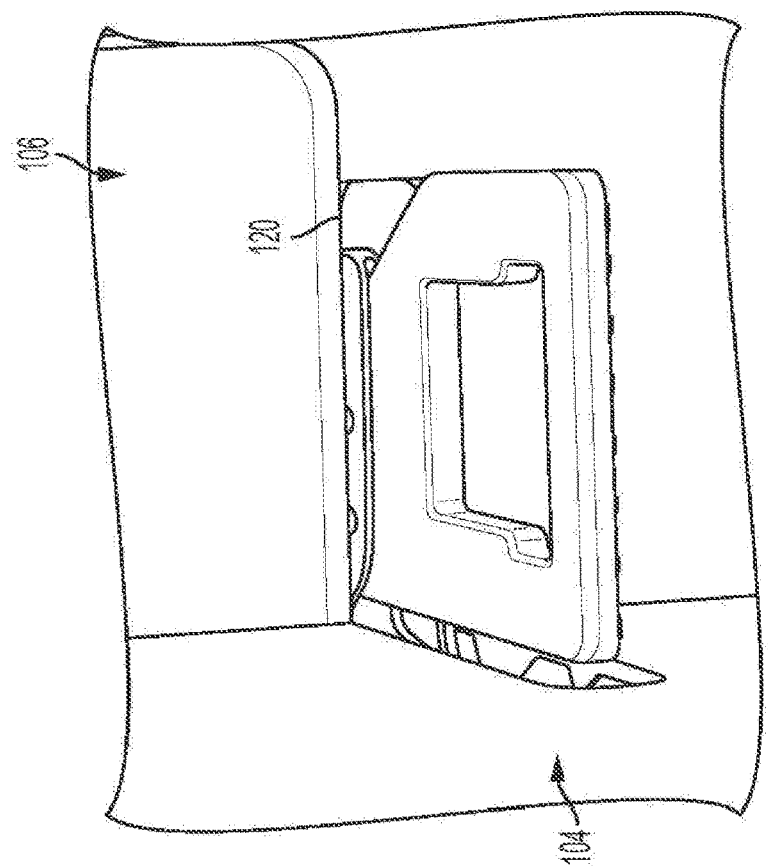
FIG. 4 is a close-up perspective view of a seat striker 104 of the cargo area partition system 100 of FIG. 1.

Referring now to FIGS. 4 and 5, FIG. 4 provides a close-up perspective view of a seat striker 104 of the cargo area partition system 100 of FIG. 1 and FIG. 5 provides another close-up perspective view of the seat striker 104 of the cargo area partition system 100 of FIG. 1. FIGS. 4 and 5 further illustrate a portion of a rear quarter trim panel 106. The seat striker 104 defines a notch 120 which is positioned at a laterally inward and rearward direction of the seat striker 104. FIG. 5 further illustrates an edge portion 122 of the partition panel 102 wedged between the notch 120 of the seat striker 104 and the rear quarter trim panel 106. Optionally, the rear quarter trim panel 106 may include a rear seat back landing (not shown) which rearwardly supports the rear seat back 112 when positioned in the upright configuration and which rearwardly supports the partition panel 102 when the rear seat back 112 is folded forwardly and down and the partition panel 102 is positioned in the configuration illustrated in, for example, FIGS. 1 and 3, where the partition panel 102 serves to partition the cargo area of the vehicle 108.

Figure 7:
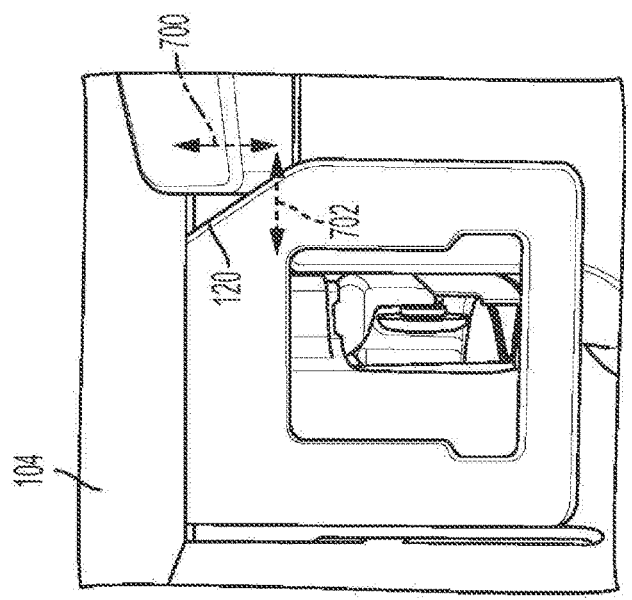
FIG. 7 is another close-up perspective view of the seat striker 104 of the cargo area partition system 100 of FIG. 1.
Figure 6:
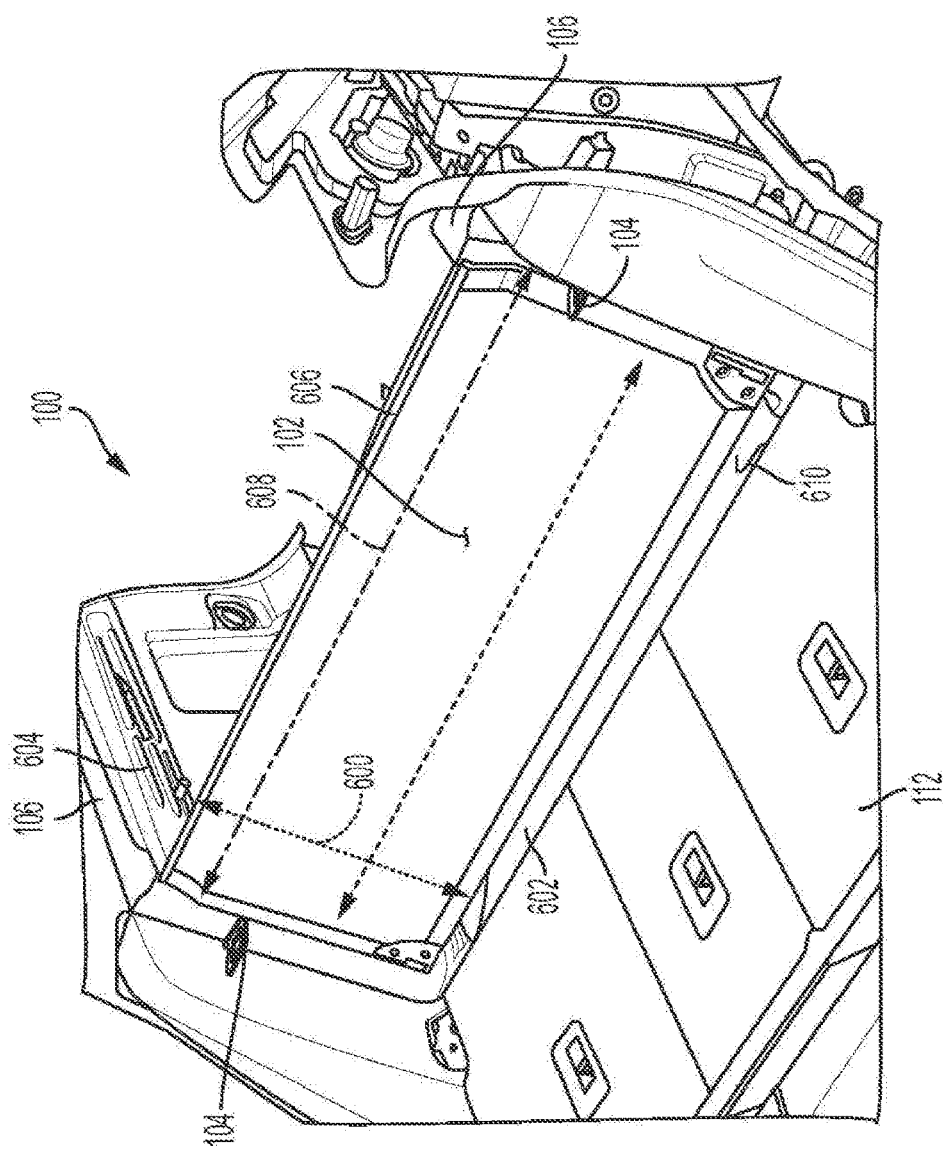
FIG. 6 is another perspective view of the cargo area partition system 100 of FIG. 1.

FIG. 6 and FIG. 7 provide views of the cargo area partition system 100 of FIG. 1 which illustrate dimensions of various portions of the system 100 relative to each other. The height 600 of the partition panel 102 may extend from a hinge area 602 of the forwardly folded rear seat back 112 to the top 604 of the rear quarter trim panels 106. Optionally, in an exemplary embodiment where the partition panel 102 may also serve a function as a cargo cover in a different configuration, the partition panel 102 may include a rearwardly extending panel portion (not shown) which may be hinged to the partition panel 102 at the top edge 606 of the partition panel. In that configuration, the rearwardly extending panel portion may rest on a top portion of the rear quarter trim panels 106 and serve to, at least partially, act as a cargo cover for the cargo area positioned to the rear of the partition panel 102.

Additionally, the distance 608 between the rear seat strikers 104 may be substantially the same as the width of partition panel 102. In this manner, the partition panel 102 may be positioned between the rear seat strikers 104. Further, the distance 610 between laterally inboard edges of the rear quarter trim panels 106 should be less than the width of the partition panel 102. In this manner, the partition panel 102 may be rearwardly supported by the rear quarter trim panels 106 when positioned as a cargo area partition for the vehicle.

FIG. 7 illustrates that the longitudinal depth 700 of the notches 120 defined by the seat strikers 104 preferably substantially equals the thickness of the partition panel 102. FIG. 7 further illustrates that the sum of the lateral depths 702 of the notches 120 in both of the seat strikers 104 and the distance between the seat strikers 104 should preferably substantially equal the lateral width of the partition panel 102. In this manner, the partition panel 102 may be positioned such that the edge portions 122 of the partition panel 102 fit into the notches 120.

Figure 8:
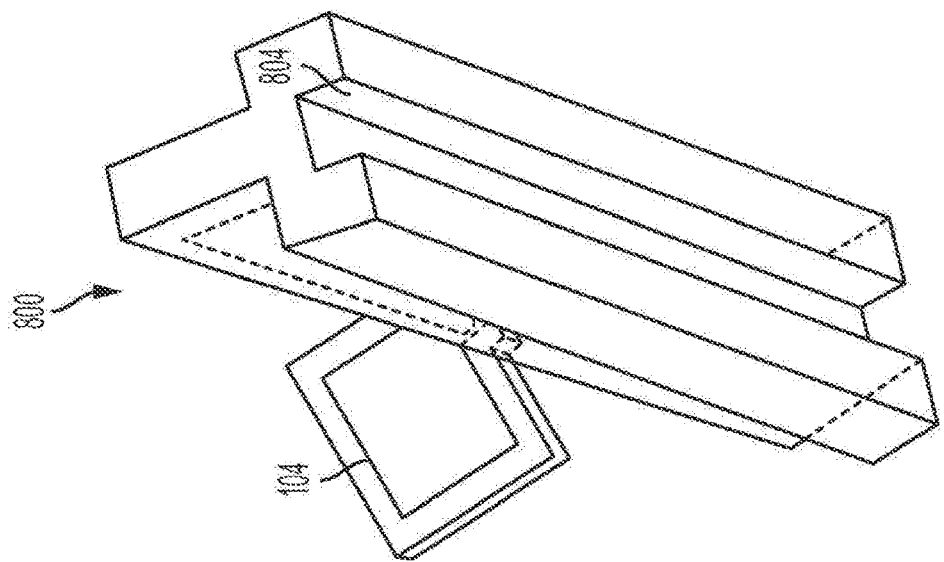
FIG. 8 is a perspective view of a partition bracket 800 for a cargo area partition system 802 for a vehicle in accordance with another exemplary embodiment of the present disclosure.

FIG. 8 is a perspective view of a partition bracket 800 for a cargo area partition system 802 for a vehicle in accordance with another exemplary embodiment of the present disclosure. The partition bracket 800 defines a channel 804 that is configured to receive an edge portion 122 of the partition panel 102. The partition bracket 800 is further configured to engage with one of the seat strikers 104 in the vehicle. In this manner, the partition panel 102 may easily be adapted to be positioned and removably fixed between the seat strikers 104 to form a partition in a cargo area in a vehicle using a pair of the partition brackets 800.

Figure 9:
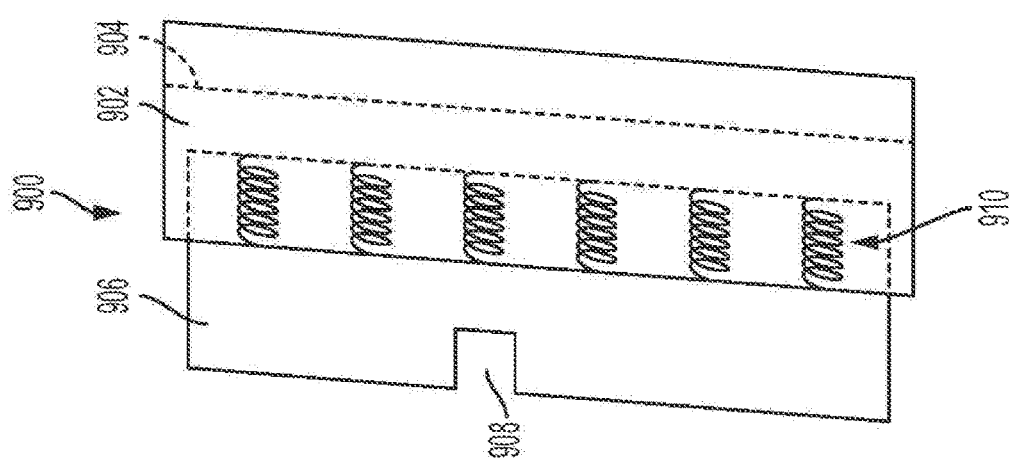
FIG. 9 is an elevation view of a partition bracket 900 for a cargo area partition system for a vehicle in accordance with yet another exemplary embodiment of the present disclosure.

FIG. 9 is an elevation view of a partition bracket 900 for a cargo area partition system for a vehicle in accordance with yet another exemplary embodiment of the present disclosure. The partition bracket 900 includes a first portion 902 which includes a channel 904 that is configured to receive an edge portion 122 of the partition panel 102. The partition bracket 900 further includes a second portion 906 which includes an engagement mechanism 908 which is configured to engage with a rear seat striker 104 in a vehicle. The first and second portions 902 and 906 are compressibly biased away from each other by, for example, a plurality of springs 910 positioned between the first and second portions 902 and 906. In this manner, a partition bracket 900 may be positioned on opposing edge portions 122 of the partition panel 102 and the first and second portions 902 and 906 of the bracket 900 may be compressed toward each other to reduce the distance between the engagement mechanisms 908. This reduction of the distance facilitates the easy positioning of the partition brackets 900 between the seat strikers 104 in the vehicle and the partition panel 102 between the seat strikers 104. Upon appropriate positioning, the biasing springs 910 may be released to enable the engagement mechanisms 908 to releasably and firmly fix the brackets 900 to the seat strikers 104. Removal of the partition panel 102 and the brackets 900 from between the seat strikers 104 may simply follow the reverse of this procedure.

Figure 10:
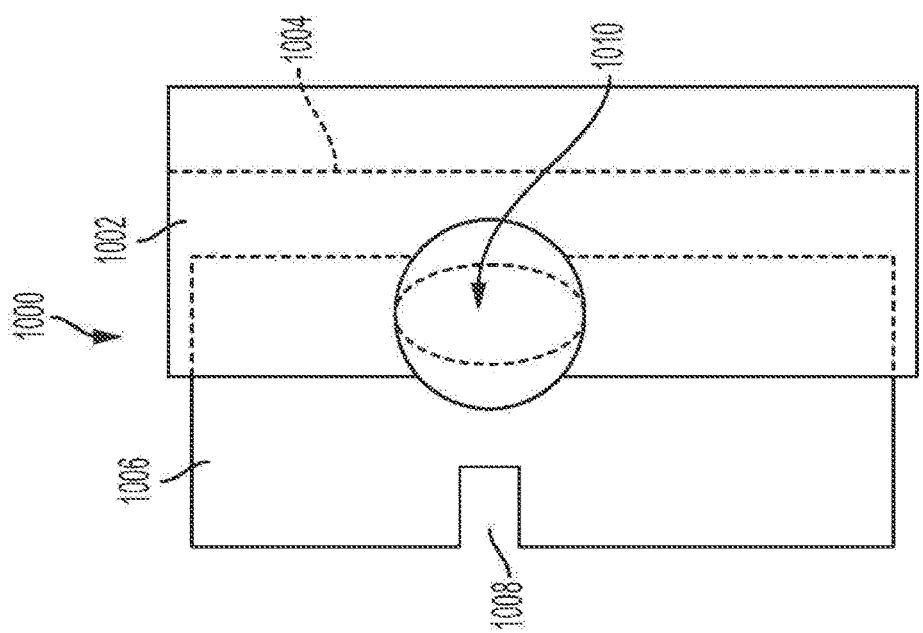
FIG. 10 is an elevation view of a partition bracket 1000 for a cargo area partition system for a vehicle in accordance with yet one more exemplary embodiment of the present disclosure.

FIG. 10 provides an elevation view of a partition bracket 1000 for a cargo area partition system for a vehicle in accordance with yet one more exemplary embodiment of the present disclosure. The partition bracket 1000 includes a first portion 1002 which includes a channel 1004 that is configured to receive an edge portion 122 of the partition panel 102. The partition bracket 1000 further includes a second portion 1006 which includes an engagement mechanism 1008 which is configured to engage with a rear seat striker 104 in a vehicle. The partition bracket further includes a rotatable cam mechanism 1010 which, when positioned at a first rotary position extends the first portion 1002 from the second portion 1006 and when positioned at a second rotary position holds the first portion 1002 closer to the second portion 1006 than when at the first rotary position. In this manner, a partition bracket 1000 may be positioned on opposing edge portions 122 of the partition panel 102 and the first and second portions 1002 and 1006 may be brought closer together by positioning the rotary cam mechanism 1010 at the first rotary position to reduce the distance between the engagement mechanisms 1008 of the two brackets 1000. This reduction of the distance facilitates the easy positioning of the partition brackets 1000 between the seat strikers 104 in the vehicle and the partition panel 102 between the seat strikers 104. Upon appropriate positioning, the rotary cam mechanism 1010 may be rotated to the second rotary position to increase the distance between the engagement mechanisms 1008 of the two brackets 1000 to enable the engagement mechanisms 1008 to releasably and firmly fix the brackets 1000 to the seat strikers 104. Removal of the partition panel 102 and the brackets 1000 from between the seat strikers 104 may simply follow the reverse of this procedure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A cargo area partition system for a vehicle, the system comprising:
    a rear seat positioned within a cabin area of the vehicle and adjacent a cargo area in the vehicle, wherein the rear seat includes a rear seat back that is pivotally positionable between an upright position and a substantially horizontal position;
    a seat striker adapted to engage and to releasably fix the rear seat back in an upright position; and
    a partition panel configured to releasably engage the seat striker and define a partition in the cargo area when the rear seat back is positioned in the substantially horizontal position.

2. The system of claim 1, wherein the seat striker defines a laterally inwardly and rearwardly facing notch.

3. The system of claim 2, wherein an edge portion of the partition panel releasably engages the seat striker notch when defining a partition in the cargo area.

4. The system of claim 3, wherein a longitudinal depth of the notch in the seat striker is larger than a thickness of the edge portion of the partition panel.

5. The system of claim 1, further comprising a rear quarter panel at least partially laterally defining the cargo area in the vehicle and forming a landing portion rearwardly supporting the partition panel.

6. The system of claim 5, wherein a height of the partition panel extends from a hinge area of the rear seat back to a top of the rear quarter trim panel.

7. The system of claim 1, further comprising a partition bracket defining a channel configured to receive an edge portion of the partition panel and further adapted to engage the seat striker to releasably fix the partition bracket to the seat striker.

8. The system of claim 7, wherein the partition bracket comprises a first portion defining the channel and a second portion including an engagement mechanism configured to engage the rear seat striker.

9. The system of claim 8, wherein the partition bracket further includes a plurality of springs resiliently biasing the first portion away from the second portion.

10. The system of claim 8, wherein the partition bracket further includes a rotatable cam mechanism which, when positioned at a first rotary position extends the first portion away from the second portion and when positioned at a second rotary position moves the first portion closer to the second portion than when at the first rotary position.

11. A cargo area partition system for a vehicle, the system comprising:
    a rear seat positioned within a cabin area of the vehicle and adjacent a cargo area in the vehicle, wherein the rear seat includes a rear seat back that is pivotally positionable between an upright position and a substantially horizontal position;
    a pair of seat strikers each adapted to engage and to releasably fix the rear seat back in an upright position, wherein each of the seat strikers defines a laterally inwardly and rearwardly facing notch;
    a pair of rear quarter panels at least partially laterally defining the cargo area in the vehicle; and
    a partition panel configured to releasably engage each of the seat strikers and define a partition in the cargo area when the rear seat back is positioned in the substantially horizontal position, wherein the partition panel includes edge portions that each releasably engage one of the seat striker notches when defining a partition in the cargo area, wherein each of the pair of rear quarter panels form a landing portion rearwardly supporting the partition panel adjacent respective edge portions of the partition panel, wherein a height of the partition panel extends from a hinge area of the rear seat back to a top of one of the pair rear quarter trim panels.

12. The system of claim 11, further comprising a pair of partition brackets each defining a channel configured to receive an edge portion of the partition panel and each further adapted to engage on of the pair of seat strikers to releasably fix the partition bracket to the seat striker.

13. The system of claim 11, wherein each of the partition brackets comprises a first portion defining the channel and a second portion including an engagement mechanism each configured to engage one of the pair of rear seat strikers.

14. The system of claim 13, wherein each of the pair of partition brackets further includes a plurality of springs resiliently biasing the first portion away from the second portion.

15. The system of claim 13, wherein each of the partition brackets further includes a rotatable cam mechanism which, when positioned at a first rotary position extends the first portion away from the second portion and when positioned at a second rotary position moves the first portion closer to the second portion than when at the first rotary position.

* * * * *